United States Patent Office 3,511,604
Patented May 12, 1970

3,511,604
CORROSION INHIBITION DURING PHOSPHATE ROCK ACIDULATION
George M. Lloyd, Jr., Lakeland, Fla., and William P. Banks, Ponca City, Okla., assignors to Continental Oil Company, Ponca City, Okla., a corporation of Delaware
No Drawing. Filed Apr. 7, 1967, Ser. No. 629,119
Int. Cl. C01b 25/00
U.S. Cl. 23—165                    4 Claims

ABSTRACT OF THE DISCLOSURE

Corrosion occurring during sulfuric acid acidulation of phosphate rock, especially that of high sulfide content, is drastically reduced by incorporation of arsenic or its compounds.

---

This invention relates to reducing the corrosivity of the composition resulting from acidulation of phosphate-containing matrix, i.e., from the process known in the art as the "wet" process for manufacture of phosphoric acid.

In the "wet" process for manufacturing phosphoric acid, a material containing phosphatic values, such as phosphate sands or rock, is reacted with sulfuric acid to produce dilute phosphoric acid and calcium sulfate, either in the form of gypsum (dihydrate), hemihydrate, or anhydrite. This slurry is subsequently filtered to remove calcium sulfate, and the weak acid is then concentrated, as by evaporation, to the desired product strength. However, virtually all available phosphatic raw materials contain substantial amounts of calcium fluoride and varying amounts of silica. Consequently, there is present in the acidulation reactor a mixture comprising phosphoric acid, sulfuric acid, hydrofluoric acid, fluosilicic acid, and, in the gaseous state, hydrogen fluoride. Further, many phosphate sources contain appreciable carbonates and/or sulfides. Thus, the acidulation mixture can also contain carbon dioxide and hydrogen sulfide. Depending upon the impurities present in the phosphatic raw material and aggravated by the high degree of agitation required for efficient acidulation, corrosion rates in this environment as high as two-thirds of an inch per year and more on stainless steel have been measured.

It is accordingly an object of the present invention to provide a process for reducing corrosion during the acidulation of phosphatic raw materials.

According to the invention, it has been discovered that addition of arsenic metal, or compounds of arsenic, to the acidulation step results in a substantial reduction in corrosion of the reaction vessels. Although the effect is noticeable on a wide variety of phosphatic raw materials, it is most pronounced when treating a raw material of high sulfur content, simply because such a raw material exhibits a very high corrosion rate during acidulation, in the absence of an inhibitor.

Although we do not wish to be so limited, it is presently our theory that tri-valent arsenic is responsible for the corrosivity reduction. Further according to our theory, addition of metallic arsenic to this acidulation environment results in the metal being oxidized to the tri-valent state and, conversely, addition of a compound containing penta-valent arsenic is followed by its reduction to the tri-valent state. Thus, although the presently preferred additive is arsenic trioxide because of its cost and valence state, any compound capable of yielding arsenic ions within the acidulation environment, such as arsenious or arsenic acid and the various arsenite and arsenate salts, are also suitable.

This discovery is especially surprising in view of the fact, as will be demonstrated, that compounds of the other metals of this periodic group, viz antimony and bismuth, have very little effect on corrosivity in this environment.

As mentioned previously herein, phosphatic raw materials of high sulfide content exhibit particularly high corrosion rates during acidulation. Early in our work on this invention, we assumed that the arsenic ion gained its effectiveness by precipitating the sulfide present, making it unavailable for corrosion. However, it was also surprisingly discovered that corrosion can be drastically reduced by using far less than the amount of arsenic compound stoichiometrically required by the sulfide.

Arsenic and its compounds have long been known as inhibitors of corrosion toward carbon steel in phosphoric acid. For example, U.S. Pats. Nos. 1,678,775; 2,482,104; and 2,567,156 all disclose use of various arsenic compounds to inhibit corrosion by phosphoric acid during steel pickling operations. However, as has been explained earlier, the environment during acidulation bears virtually no resemblance to phosphoric acid in view of the many other corrosive components present. This is evidenced by the fact that this prior art is concerned with protection of carbon steel, whereas the acidulation environment is often highly corrosive to some of the most corrosion-resistant stainless steels.

The amount of arsenic ion required according to the present invention will, of course, depend upon several variables. Included among these variables, but not limited thereto, are the amounts of the several corrosion-causing impurities present in the phosphatic raw material, the temperature of acidulation, the degree of corrosion protection desired, the material of construction of which the acidulation reaction system is built, and the concentration of major acids (phosphoric and sulfuric) in the reactor. However, we have found that as little as about five one-thousandths of one weight percent, and even less, of arsenic trioxide, based on the weight of the phosphate rock, reduces corrosion rate by a factor of about 10. Amounts of from one-half to about one weight percent arsenic trioxide equivalent, based on the weight of rock treated, generally reduce corrosion to a negligible rate, although of course more than even these amounts can be used.

Further understanding of the invention can be gained by study of the following examples.

EXAMPLE 1

A phosphate rock raw material from Beaufort County, N.C., was tested for its corrosion rate during acidulation with sulfuric acid. This rock occurs with a high organic impurity content, and the organic impurities cause excessive foaming during the acidulation reaction. In order to reduce the foaming problem, this rock is sometimes calcined prior to acidulation. However, the calcining step, while decreasing the foam problem, increases the sulfide content of the rock, and the corrosivity of the acidulation mixture. A comparison of calcined and uncalcined rock is shown below. Acidulation was with sulfuric acid, and corrosion rates are of type 317 stainless steel.

| Type rock | Rock sulfide content, parts per million | Corrosion rate during acidulation, m.p.y. (milli-inches per year) |
|---|---|---|
| Uncalcined | 40 | 250 |
| Calcined at 1,300° F | 2,660 | 697 |

EXAMPLE 2

The effect of varying amounts of arsenic trioxide on corrosion rates toward type 317 stainless steel during sulfuric acid acidulation of calcined North Carolina phosphate rock is shown below.

| Ratio, $As_2O_3/3S$ | Corrosion rate, m.p.y. | Weight percent $As_2O_3$ based on rock | Pitting present |
|---|---|---|---|
| 0 | 697 | 0 | No. |
| 0.01 | 72 | 0.0043 | Slight. |
| 0.03 | 38 | 0.013 | Do. |
| 0.05 | 4 | 0.021 | No. |
| 0.10 | 3 | 0.0425 | No. |
| 1.0 | 3 | 0.425 | No. |
| 3.0 | 0 | 1.275 | No. |

From this table, it can be seen that when only one percent of the amount of arsenic trioxide required stoichiometrically to precipitate all the sulfide was used, the corrosion rate was reduced by a factor of nearly 10, from 697 to 72 m.p.y. Amounts from about 5 percent of the stoichiometric amount, and more, reduce the corrosion rate to a negligible figure. It can also be seen that as little as about four-one thousandths weight percent arsenic trioxide, based on the rock charged, is quite effective in reducing corrosivity of the mixture resulting from this highly corrosive raw material. Even smaller amounts are effective for a less corrosive raw material.

EXAMPLE 3

The experimental procedure of Example 2 was used to compare the inhibiting effects of arsenic with antimony and bismuth oxides during sulfuric acid acidulation of calcined North Carolina rock, corrosion again being measured on type 317 stainless steel. Results are as follows:

| Oxide, $M_2O_3$ | Ratio, $M_2O_3/3S$ | Corrosion rate, m.p.y. | Wt. percent $M_2O_3$ based on rock | Pitting present |
|---|---|---|---|---|
| None | 0 | 697 | 0 | No. |
| $As_2O_3$ | 0.05 | 4 | 0.021 | No. |
| $As_2O_3$ | 0.10 | 3 | 0.0425 | No. |
| $Sb_2O_3$ | 0.068 | 295 | 0.0425 | No. |
| $Bi_2O_3$ | 0.068 | 425 | 0.0672 | No. |

EXAMPLE 4

Because of the poisonous nature of arsenic compounds, and the fact that the product phosphoric acid is often incorporated into fertilizers used in growing food for human consumption, it was deemed advisable to study the ultimate effects of adding arsenic compounds to the process. It would be possible for the arsenic to dissolve in and thus remain in the process acid, or to be adsorbed by the calcium sulfate which is removed from the acidulation mixture by filtration but be removed from the calcium sulfate filter cake by wash water which is added to the product acid, or to be adsorbed on and remain on the filter cake, in this instance gypsum. Accordingly, a laboratory test was made in which 100 g. of North Caroline phosphate rock were acidulated with 100 g. of 85% phosphoric acid (to represent the recycle of phosphoric acid occurring during normal acidulation), 50 ml. of 98% sulfuric acid, 198 g. water and, as the inhibitor, 0.041 g. arsenic trioxide. After acidulation, the gypsum was separated from the acid by filtration and then washed with two large portions of distilled water. The product weak phosphoric acid, in the amount of 127 g., contained 13 p.p.m. arsenic trioxide, or 0.0017 g. The first and second water washes contained, respectively, 14.5 p.p.m. in 192 g. for an arsenic trioxide content of 0.0028 g., and 9.2 p.p.m. in 148 g. for an arsenic trioxide content of 0.0014. Total arsenic trioxide in the three liquids was 0.006 g., or about 15% of the amount charged. This indicates that about 85% of the arsenic trioxide charged remains tightly adsorbed on the filter cake, which is normally discarded in a commercial operation.

EXAMPLE 5

Corrosivity of an acidulation mixture is reduced in amount corresponding to the results in Example 2 when arsenic metal and other arsenic salts than the trioxide, including but not limited to arsenic trichloride, arsenic pentachloride, potassium arsenate, and sodium arsenite, are used in equivalent amount, calculated as arsenic trioxide.

The acidulation of phosphatic material with sulfuric acid according to the so-called "wet process" is per se well known in the art, and accordingly no further description of the reaction or its conditions is necessary. Although corrosivity was tested in the examples on stainless steel, it should be understood that the present invention is useful for protecting ferrous metals broadly.

Having thus described the invention by providing specific examples thereof, it is to be understood that no undue limitations or restrictions are to be drawn by reason thereof and that many variations and modifications are within the scope of the invention.

What is claimed is:

1. In a process for producing phosphoric acid by reaction of sulfuric acid with a phosphatic raw material selected from the group consisting of phosphate sand and phosphate rock to produce a reaction mixture comprising dilute phosphoric acid and a calcium sulfate, the improvement which comprises adding to said reaction a corrosion-inhibiting amount of an inorganic arsenical material capable of yielding tri-valent arsenic ions in said reaction mixture.

2. The process of claim 1 wherein said arsenical material is arsenic trioxide.

3. The process of claim 2 wherein said phosphatic raw material, when fed to said reaction, contains about 40 p.p.m. sulfide.

4. The process of claim 3 wherein said amount is at least about five one-thousandths weight percent based on said raw material.

References Cited

UNITED STATES PATENTS

| 1,678,775 | 7/1928 | Gravell | 23—139 |
| 2,068,868 | 1/1937 | Pier | 208—10 |
| 2,482,104 | 9/1949 | Dolian | 23—165 |
| 2,567,156 | 4/1951 | Malowan | 23—165 |
| 2,635,996 | 4/1953 | Rohrback | 252—8.55 |
| 2,636,806 | 4/1953 | Winter | 23—165 X |
| 2,728,727 | 12/1955 | Marsh. | |
| 3,087,778 | 4/1963 | Negra | 252—387 |
| 2,635,698 | 4/1953 | Rohrback et al. | |

JULIUS FROME, Primary Examiner

L. B. HAYES, Assistant Examiner

U.S. Cl. X.R.

23—122; 106—14